United States Patent [19]

Kauffman et al.

[11] Patent Number: 4,530,856
[45] Date of Patent: Jul. 23, 1985

[54] METHOD FOR MAKING DECORATIVE LAMINATE

[75] Inventors: William J. Kauffman, Lititz; Ralph W. Wright, Lancaster, both of Pa.

[73] Assignee: Armstrong World Industries, Inc., Lancaster, Pa.

[21] Appl. No.: 588,339

[22] Filed: Mar. 12, 1984

Related U.S. Application Data

[62] Division of Ser. No. 402,954, Jul. 29, 1982, Pat. No. 4,450,194.

[51] Int. Cl.³ .......................... B05D 3/02; B05D 5/02
[52] U.S. Cl. .................................... 427/197; 427/203
[58] Field of Search .............. 428/172, 204; 427/197, 427/198, 203, 199

[56] References Cited

U.S. PATENT DOCUMENTS

| | | | |
|---|---|---|---|
| 3,000,754 | 9/1961 | Zentmyer | 428/206 |
| 3,121,642 | 2/1964 | Biskup | 427/199 |
| 3,980,511 | 9/1976 | Broucelle | 156/62.4 |
| 4,018,647 | 4/1977 | Wietsma | 162/168.1 |
| 4,234,379 | 11/1980 | Conway et al. | 162/145 |
| 4,298,646 | 11/1981 | Haemer et al. | 428/206 X |
| 4,405,657 | 9/1983 | Miller, Jr. et al. | 427/197 X |
| 4,409,280 | 10/1983 | Wiley et al. | 428/204 X |

Primary Examiner—Evan K. Lawrence

[57] ABSTRACT

A decorative laminate and method of manufacture therefor are provided wherein the laminate has a differential texture and a differential gloss wherein the textured regions contain PVC resin particles and have a lower gloss than adjoining regions without PVC resin particles. The decorative article is useful as a floor covering.

18 Claims, 3 Drawing Figures

4,530,856

METHOD FOR MAKING DECORATIVE LAMINATE

CROSS REFERENCE TO RELATED APPLICATION

This is a division of application Ser. No. 402,954, filed July 29, 1982, now U.S. Pat. No. 4,450,194.

FIELD OF THE INVENTION

The present invention relates to a method for producing a decorative laminated that is suitable as a surface covering for floors, walls, etc., and, more particularly, is directed to a method for producing a decorative laminate having differential surface texture and differential surface gloss features.

BACKGROUND OF THE INVENTION

Generally speaking, decorative laminates useful as surface coverings for floors are well-known in the art and have achieved broad use in both domestic and commercial environments. For example, decorative laminates in the form of sheet material of a resinous polymer composition, e.g., polyvinyl chloride, on a suitable substrate, e.g., a fibrous backing sheet, have been used for many years as sheet flooring. A goal common to all manufacturers of sheet flooring is to provide flooring products having appealing surface decorative effects that are both attractive from an aesthetic viewpoint and useful from a functional standpoint. To illustrate, many methods and processes such as mechanical embossing, chemical embossing or inlaying have been utilized to provide contrasting surface finishes and thereby impart decorative effects to the sheet flooring. For example, U.S. Pat. Nos. 3,000,754; 3,121,642 and 4,298,646 each discloses different techniques or means for making floor covering products such as floor tiles or sheet flooring having decorative surface effects

SUMMARY OF THE INVENTION

According to the present invention there is provided a method for making a decorative laminate having differential surface texture and differential surface gloss suitable as a floor covering, said method comprising applying to a substrate material a vinyl plastisol printing ink composition in register with a printed image on said substrate; applying an excess of PVC resin particles over said vinyl plastisol printing ink composition and the surface of said substrate and removing the excess of said PVC resin particles that do not adhere to said vinyl plastisol printing ink composition; heating said substrate to gel said vinyl plastisol printing ink thereon and thereby firmly adhere said PVC resin particles to said vinyl plastisol printing ink; forming a top resinous layer on said PVC resin particles and the surface portion of said substrate intermediate said PVC resin particles by applying a transparent synthetic organic polymer over said PVC resin particles and the exposed surface of said substrate, and heating the resulting top resinous layer thereby to provide a fused decorative laminate, whereby the regions of said decorative laminate overlying said PVC resin particles exhibit a rougher surface texture and a lower gloss than the regions of said decorative laminate intermediate said PVC resin particles.

DETAILED DESCRIPTION OF THE INVENTION

Figure 1:
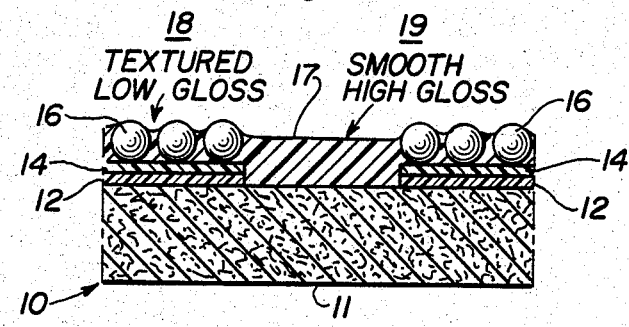
FIG. 1 is a cross-sectional view depicting the arrangement of elements and structural features of the decorative laminate of the invention.
Figure 2:
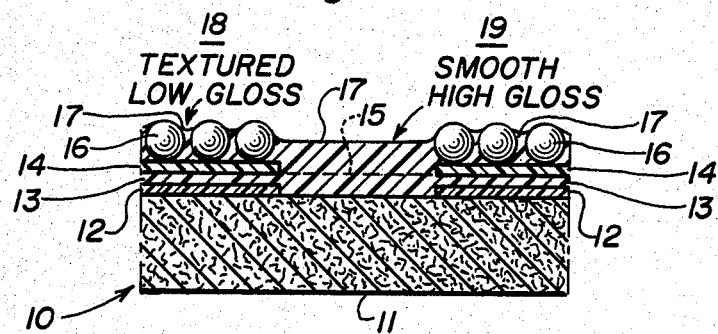
FIG. 2 is a cross-sectional view of another embodiment of the decorative laminate of the invention having a transparent layer of polymeric material interposed between the printed substrate and the polyvinyl chloride particles.

Referring to FIGS. 1 and 2, which disclose preferred embodiments, the decorative laminate 10 of the invention comprises a substrate member 11 which is often referred to as a base layer or backing sheet. The substrate member or element 11 bears a printed image 12 on one surface thereof. A layer 14 of vinyl plastisol printing ink is disposed in register with the printed image 12 on substrate 11. Particles of polyvinyl chloride (PVC) 16 are disposed on and secured to the layer 14 of vinyl plastisol printing ink and are arranged or distributed in register with the printed image 12 on substrate 11. A top layer 17 of transparent synthetic organic polymeric material overlies both PVC resin particles 16 and the regions above substrate 11 that are intermediate the PVC resin particles. Layer 17 of laminate 10 is often referred to as a "wear layer" when the laminate is used as a floor covering. The decorative laminate of the invention as shown in FIG. 1 is of unitary construction wherein the elements or components thereof described hereinabove have been fused by heat in accordance with the method described hereinafter.

The decorative laminate 10 depicted in FIG. 2 differs from that shown in FIG. 1 by including a layer 13 of transparent synthetic organic polymeric material which covers both printed image 12 and the surface of substrate member 11 intermediate the printed image 12 thereon. Interrupted line 15 shown in FIG. 2 illustrates the top surface of layer 13. In the embodiment of FIG. 2, the layer 14 of vinyl plastisol printing ink is disposed on layer 13 in register with the printed image 12 on substrate 11.

The elements of decorative laminates 10 will be described individually herebelow in conjunction with a description of the method for combining these elements to make the decorative laminates.

The Substrate

The decorative laminate 10 is formed on a substrate or backing sheet 11 of strong, durable and flexible material. The flexible backing can be woven, felted or a solid sheet of synthetic or natural material. The conventional flexible backing is a web of felted fibers. The felt generally is produced using a Fourdrinier or cylinder paper machine with the thickness of the resulting sheet being that usually used in floor and wall covering, that is, from 0.02 to 0.08 inch. A thickness of about 0.032 inch is usually preferred. The fibrous material used is normally cellulose or asbestos in origin, although other fibers can be used including those of mineral and animal origin. The sources of cellulosic material can include cotton or other rag material, wood pulp including both ground wood and chemical wood pulp, paper, boxes, or mixtures thereof in any proportion. The web can also contain fillers, such as wood flour.

The felt can be strengthened and improved in water resistance by impregnation with a bituminous material. Numerous bituminous materials are well-known as impregnants in the production of printed surface coverings and include asphalts of petroleum or natural origin and tars and pitch residues of animal or vegetable origin. These materials can be treated to attain the desired physical properties of softening point or viscosity for satisfactory use by such treatment as air blowing, steam distillation and the like.

The impregnant should be uniformly dispersed throughout the felt sheet. This can be controlled to some extent by the saturating technique through use of pressure rolls in the saturating bath. Where the impregnant is not uniformly dispersed throughout, blistering can frequently occur due to high concentrations of material adjacent to one surface of the felt.

Other impregnants for the fibrous sheet can also be used to form backing sheets for use in the production of printed surface coverings in accordance with the invention. Such materials as phenolformaldehyde and phenol-urea resins, polymerized vinyl compounds, such as polyvinyl chloride, polyvinyl acetate and the like, cellulose acetate, cellulose nitrate, butadiene-styrene copolymer, butadiene acrylonitrile copolymer, natural rubber and the like can be used. Polymerizable materials can also be incorporated into the felt and the sheet subjected to heat to cure and polymerize the material. Such materials as natural and synthetic drying oils, mixtures of polyhydric alcohols and polybasic acids which cure to form polyesters, mixtures of polyhydric alcohols and polyisocyanates which cure to form urethane polymers, and the like can be used.

If an impregnated backing sheet is used, it usually is provided with one or more seal coats prior to printing the decorative design The seal coats perform the desirable function of masking the color of the felt and preventing the impregnant from bleeding through and staining the wear layer and, in addition, create a smooth uniform surface suitable as a base for printing. Felt sheets of the type commonly used as backings for printed surface coverings tend to have minor surface irregularities due to non-uniformities in the felt-making equipment. The sheet also frequently shows a number of small protruding lengths of fibers. The seal coats are designed to hide all these irregularities. The total thickness of seal coats required is normally from about 1 to about 12 mils. This thickness can be created through use of a single thick coating or several superimposed thinner coatings. Using the conventional techniques of coating, such as flexible doctor roller application, the desired thickness is created by use of more than one coating. The use of multiple coatings is also desirable in promoting optimum adhesion of the wear surface layer to the backing, since the seal coat applied directly to the fibrous backing can be designed for optimum sealing against migration of bituminous impregnant and the uppermost seal coat can be designed for optimum adhesion to the polyvinyl chloride surface wear layer.

The seal coat is conveniently applied in the form of an aqueous emulsion of resinous binder and filler. In the preparation of the seal coat, a resinous binder and filler are emulsified in water in the presence of conventional wetting agents, thickening agents, anti-foam agents, sequestering agents and the like. After the application of the seal coat to the backing sheet, the coating is dried by subjecting the sheet to heat, as for example, in the range of about 100° F. to about 150° F. for about 30 minutes to about 2 hours. Alternately, drying can be effected by exposing the coated sheet to a temperature of 350° F. to 400° F. for about 30 to about 300 seconds The resinous compound of the seal coat is preferably a vinyl resin. Suitable resins. are commercially available in the form of aqueous dispersions containing from 40 to 50 percent solids, and vinyl resin plastisols and organosols. The dispersion can contain, in addition to the plasticizer, resin, pigment and filler, conventional wetting agents, thickening agents, anti-foam agents, sequestering agents and alkali. Suitable wetting agents include the sodium salt of polymerized alkyl aryl sulfonic acid, potassium oleate, alkyl aryl polyether sulfonate, resin acid soap and the like. Ammonium caseinate, borated casein, methyl cellulose, carboxymethyl cellulose, hydroxyethyl cellulose and the like are satisfactory thickening agents. Examples of suitable anti-foam agents are pine oil and silicone anti-foam agents, diglycol laurate, and octyl alcohol. Suitable sequestering agents include tetrasodium pyrophosphate and the tetrasodium salt of ethylenediamine tetra-acetic acid. The alkali provides a pH of about 7.0 so that there will be no tendency for the latex to coagulate. Calcium hydroxide, sodium hydroxide, ammonia and potassium hydroxide are suitable alkalis for this purpose.

Normally, the pigments and fillers are ground with water in the presence of wetting agents, thickening agents and the like and the pigment dispersion is mixed with the vinyl resin and plasticizer later. Alternately, the seal coat can be effectively applied in the form of a solution using, for example, a solvent such as toluene or methyl ethyl ketone. However, the cost of using solvent and the fire and health hazards created by its use render the method undesirable.

The seal coat can contain stabilizers to retard the decomposition of the vinyl resin and increase the life of the product, such as sulfides and sulfites of aluminum, silver, calcium, cadmium, barium, sodium, magnesium, strontium; lead and tin stearates; oleates and other complexes; glycerine, leucine, alanine, o- and p-aminobenzoic and sulfanilic acids, hexamethylene tetramine, salts including phosphates, stearates, palmitates, oleates, ricinoleates, abietates, laurates, salicylates; and the like.

As stated hereinabove, the resin component of the seal coat is preferably a vinyl resin, that is, a polymeric material obtained by polymerizing compounds containing at least one —$CH=CH_2$ radical. Useful vinyl resins include homopolymers, such as polyvinyl chloride, polyvinyl acetate, polyvinyl propionate, polyvinyl butyrate, polymerized vinylidene chloride, polymerized acrylic acid, polymerized ethyl acrylate, polymerized methyl acrylate, polymerized propyl acrylate, polymerized butyl acrylate, and the like; copolymers of the above with each other such as vinyl chloride-vinyl acetate copolymer, vinylidene chloride-vinyl chloride copolymer, methyl methacrylate-vinyl chloride copolymer, methyl acrylate-ethyl acrylate copolymer, ethyl acrylate-butyl acrylate copolymer, and the like and copolymers of the above with other monomers copolymerizable therewith, such as vinyl esters, including vinyl bromide, vinyl fluoride, vinyl choroacetate, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, chlorostyrene, coumarone, vinyl pyridine and the like; maleic and fumaric acid and their derivatives such as diethyl maleate, dibutyl fumarate and the like; unsaturated hydrocarbon such as ethylene, propylene, butylene and the like; allyl compounds such as allyl acetate, allyl chloride, allyl ethyl ether, and the like; conjugated and cross-conjugated unsaturated compounds such as butadiene, isoprene, chloroprene, 2,3-dimethylbutadiene-1,3, divinyl ketone and the like. The monomers listed hereinabove are useful in preparing copolymers with a vinyl resin and can be used as modifiers in the polymerization, in which case they may be present in an amount of a few percent, or they can be used in larger quantities, up to as high as 40 percent by weight of the mixture to be polymerized. If desired, a mixture of vinyl resins can be used in preparing coating paints for use in the invention.

A plasticizer for the vinyl resin is also frequently present in the seal coat composition. Suitable plasticizers for the vinyl resin include ester type plasticizers such as tributyl phosphate, dioctyl phthalate, dipropylene glycol dibenzoate, phenyl phosphate, dibutyl tartrate, amyl tartrate, butyl benzyl benzoate, dibutyl sebacate, dioctyl adipate, didecyl adipate and the like, rubbery plasticizers, such as butadiene-styrene copolymer, butadiene-acrylonitrile copolymer, and the like, and other materials which function as plasticizers, such as epoxidized drying oils, aromatic hydrocarbon condensates and the like. Where certain flexible soft vinyl resins are used in formulating the seal coat, such as polymers containing large proportions of ethyl acrylate, no plasticizer is needed. However, in most instances, a plasticizer is essential in order to impart the necessary properties of flexibility to the dried seal coat film. The seal coat must be compatible with the subsequently applied layer.

Likewise, plastisol or organosol dispersions of vinyl resins can be utilized for seal coats on one or both surfaces of substrate 11.

The thickness of the relatively flat, fibrous substrate 11 will depend to a large extent upon the particular product to be made and the particular subsequent use for which it is intended. Normally, a thickness in the range of from about 10 mils to about 90 mils is satisfactory.

Figure 3:
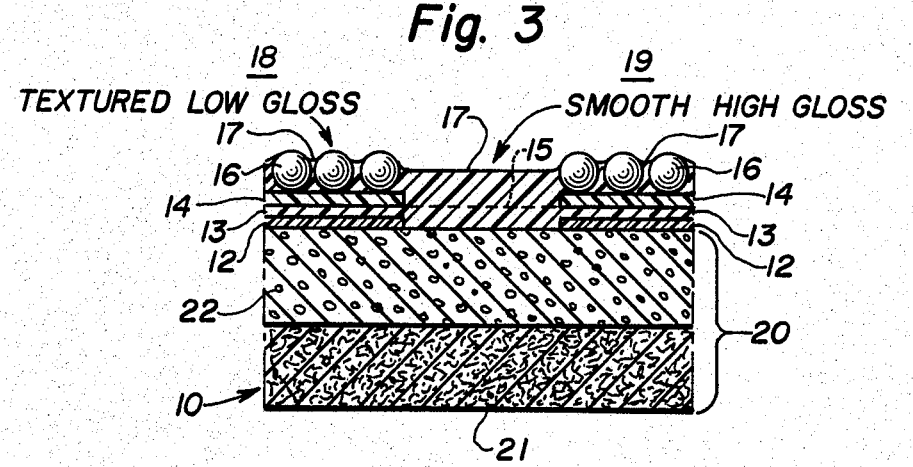
FIG. 3 is a cross-sectional view of another embodiment of the decorative laminate of the invention having a base layer of different construction than that shown in FIGS. 1 and 2.

The substrate 11 of FIGS. 1 and 2 and substrate element 21 of FIG. 3 may also be a thin sheet or mat of glass fibers that is saturated or completely coated with a heat-cured polyvinyl chloride plastisol or organosol. Glass fiber mats are readily available and are disclosed in, for example, U.S. Pat. Nos. 3,980,511; 4,018,647 and 4,234,379, including also German Patent Publication OS No. 2,605,879, and the many patents that are described in the aforementioned patents.

Printed Image on Substrate

A decorative printed image 12 is applied to the substate 11 on the coated surface thereof after drying the coating. Printing is conventional and paints and inks normally used for aplication of a decorative design to a vinyl film or layer are used. The composition is preferably formulated so that the binder of the ink contains an appreciable quantity of a vinyl resin. Suitable vinyl resins include vinyl chloride polymer, vinyl chloride-vinyl acetate copolymer, vinyl chloride-vinyl propionate copolymer, vinyl butyrate polymer, vinylidene chloride polymer, vinylidene chloride-vinyl chloride copolymer, copolymers of vinyl chloride and vinylidene chloride with esters of maleic and fumaric acid, such as dimethyl, diethyl, and dibutyl maleate and fumarate, and the like. Extender resins, such as nitrocellulose or acrylic polymers, can be employed as a portion of the binder of the ink or paint.

The decorative printing composition contains pigments according to the colors desired and is preferably formulated as a solution in the solvent such as cyclohexanone, methyl ethyl ketone, methyl isobutyl ketone and the like.

The decorative printing composition can be applied to the seal coated surface of the sheet in any way appropriate for producing the particular decoration desired. Any of the rotary graphic art printing processes, such as rotogravure, offset printing or lithography, can be used. If desired, the design can be applied by conventional block printing technique.

Base Layer of Transparent Synthetic Organic Polymer

An optional base layer 13 of transparent synthetic organic polymeric material may be applied to printed substrate 11. The polymeric composition of base layer 13 may be any of the known synthetic resins such as, for example, a polymer or copolymer of vinyl chloride or other resins such as polyurethane (sufficiently dimensionally stable) an elastomer such as natural or synthetic rubber, etc. Although a polymer or copolymer of vinyl chloride in the form of a plastisol is the preferred and typical synthetic resin to be incorporated into the base resinous polymer composition, many other resins are of equal applicability, not only in plastisol form but also in organosol, latex or solvent form. The specific resin and its particular form of use as it is being utilized does not relate to the essence of the inventive concept and many other resins are set forth in the previously mentioned U.S. Patents.

The base layer 13 of resinous composition may be applied by a doctor blade, or roll coated, or poured, or cast, or otherwise applied or formed and adhered to the carrying sheet material, such as the fibrous backing sheet material 11, in a substantially uniform manner in a relatively uniform thin coating by procedures wellknown in the art. The thickness of base resinous composition 13 as applied and still wet, is in the range of from about 1 mil to about 50 mils, or even more, if so desired or required by its subsequent use.

The Gelling of the Base Resinous Composition

After the base layer 13 of resinous plastisol composition has been applied or formed on the carrying backing sheet material, it is then heated under moderately gentle heat for a period of time of from about 1 minute to about 4 minutes at an elevated temperature of from about 240° F. to about 450° F., but more normally commercially from about 290° F. to about 350° F., whereby the plastisol gels and firms so that it can be more easily handled and processed in subsequent operations. The elevated temperature, however, is not that sufficiently high as to cause blowing or foaming of the base resinous polymer composition.

The Vinyl Plastisol Adhesive Composition

The substrate 11 or, optionally, the gelled, base layer 13 of resinous composition, is printed or coated with a suitable printing ink composition or compositions 14 in the desired or required pattern or design in register with the printed image 12 on substrate 11. The particular pattern or design which is used does not relate to the essence of the invention and any suitable pattern or design may be selected. The printing procedure, in general, is conventional and should require no further description, inasmuch as such procedures are well known in the industry and are described in many publications and patents.

The printed layer 14, preferably of vinyl plastisol, is approximately 3 to 4 mils thick, although any desirable thickness may be utilized. Printed layer 14 is preferably applied to substrate 11 by means of a rotary screen/blade coating device. The combination of a rotary screen printer and a blade squeegee permits good control of the plastisol ink application and allows the rotary screen to slip for achieving good registration of the ink plastisol. In contrast, a rotary printing screen equipped with a roller squeegee has not performed as satisfactorily and such combination is not recommended at this time.

Application of PVC Particles to the Printed Base Resinous Layer or Substrate Particles 16 of polyvinyl chloride (PVC) resin are applied to the printing ink plastisol preferably by flooding the entire substrate 11 or the base layer 13 and the printing ink layer 14 thereon with the PVC resin particles. The PVC resin particles 16 adhere to the printing ink 14, and the excess PVC resin particles 16 that overlie the unprinted surface portions of substrate 11 or base layer 13 are removed by appropriate means, e.g., air knife, vacuum or suction techniques and devices.

The PVC resin particles 16 utilized for making the decorative laminate of the invention must be characterized by two essential features, namely, particle size and plasticizer absorption properties. Specifically, the PVC resin particles 16 must have a particle size diameter of between about 4 mils and about 20 mils with, preferably, an average particle size diameter of between about 8 and about 12 mils.

Also, the PVC resin particles 16 must be classified as a Type GP resin (as specified in Table 1 of ASTM-D-1755) and characterized by a plasticizer absorption greater than about 40 grams per 100 grams of PVC resin (as measured by ASTM-D-3367, modified to allow a standing time of 5 minutes instead of the 15 minutes specified in paragraph 7.6 of the ASTM procedure). Satisfactory results in terms of differential gloss and differential texture have been achieved using G P resins having a cell classification number of 4 (ASTM-D-1755).

PVC resin particles 16 having the foregoing particle size and plasticizer absorption properties are necessary in order to obtain the desired differential gloss and differential texture features of the decorative laminate of the present invention. Satisfactory results have been obtained using a particulate PVC resin sold under the tradename designation "Geon 92" by the B. F. Goodrich Chemical Company, Inc., Cleveland, Ohio. Particulate PVC resins that have not provided the desired differential gloss and differential texture properties include blending resins such a TENNECO 501 and Goodyear Pliovic M-70, and dispersion PVC resins such as TENNECO 1732 and TENNECO 1755.

The PVC resin particles 16 can be either clear, i.e. uncolored, or colored. Suitably colored PVC resin particles 16 can be obtained by mixing clear PVC resin particles with dry opaque pigments with a suitable amount of plasticizer. The concentration of opaque pigment utilized should not be so high as to adversely affect the absorption property of the PVC resin particles, since otherwise, the absorption property of the PVC resin particles and the desired differential texture and differential gloss effect of the ultimate decorative laminate product are not obtained. Use of too large a quantity of plasticizer should be avoided when preparing colored PVC resin particles 16. Large quantities of plasticizer adversely affect the desired differential texture and differential gloss visual features of the finished laminate product (e.g., the finished laminate product will result in less surface texture and higher gloss). For example, the quantity of primary plasticizer which can be added to the PVC resin, such as Geon 92 as in Example 1 should be less than about 30 phr.

Heating Printed Layer to Adhere PVC Resin Particles Thereto

The substrate 11 or the base layer 13 having the printed layer 14 with PVC resin particles 16 adhered to the plastisol ink of layer 14 is heated by conventional means, e.g., in a convection oven or by radiant heaters, to gel the plastisol and firmly adhere the PVC resin particles thereto. Care must be exercised to avoid overheating the printed layer 14 during the gelling sequence, since otherwise the PVC resin particles 16 will absorb the printed plastisol 14 and not produce the desired differential gloss and differential texture effect in the final product. A suitable heating range is between about 250° F. and about 450° F., preferably 300° F.

Top Layer of Transparent Synthetic Organic Polymer

The substrate 11 or the base layer 13 having PVC resin particles 16 selectively positioned thereon and adhered thereto is coated with a top layer 17 of transparent, synthetic organic polymeric material such as, for example, a polyvinyl chloride (PVC) plastisol. Preferably, the transparent PVC plastisol has a viscosity of about 1000 centipoises and is applied to the intermediate laminate by means of a blotch rotary screen equipped with a blade squeegee. Suitable results have been obtained with plastisols having a viscosity ranging between about 350 and about 1250 centipoises. The combination of a blotch rotary screen printer/blade coating device has provided better results to date than other combinations of coating equipment or techniques, such as, for example, a blade-over-roll, air knife, reverse roll or roller-type squeegee and rotary screen coating techniques.

Use of plastisols having a viscosity much greater than about 1250 centipoises is not recommended because the necessary quantity of the plastisol is difficult to control. Also, such plastisols have inadequate flow properties around and into the PVC resin particles 16. As a result, the desired differential gloss and differential texture features are not obtained in the final product.

The top layer 17 of the PVC plastisol extends over the entire surface of the intermediate decorative laminate so as to overlie both the PVC resin particles 16 and the regions on the substrate 11 or base layer 13 that are intermediate the PVC resin particles. Use of a rotary screen applicator that is equipped with a blade squeegee device has permitted achievement of a thin, uniform PVC plastisol coating on the PVC resin particles which thoroughly saturates the region containing the PVC resin particles while also coating the regions on substrate 11 or base layer 13 that are intermediate the PVC resin particles.

Fusing the Top Resinous Composition

After the top layer 17 of resinous plastisol composition has been applied over the entire upper surface of the intermediate decorative laminate, it is heated by conventional means, e.g., in a convection oven or by radiant energy, at an elevated temperature to fuse the entire product and provide a product of unitary construction. Suitable temperatures for heating top layer 17 include a range of between about 350° F. and about 500° F., preferably 400° F.

As shown in FIGS. 1, 2 and 3, the resulting fused, decorative laminate is characterized by unique surface features comprising portions or regions 18 that exhibit a rougher surface texture and have a low gloss, and regions 19 that are smooth and have a high gloss. Also, the surface regions 18 that contain the PVC resin particles 16 have a greater thickness than regions 19 thereby creating an embossed effect. Notably, the embossed effect of the decorative laminate is achieved without employing secondary or additional measures such as chemical or mechanical treatment of the laminate. If desired, enhanced embossing effects can be achieved by utilizing conventional chemical or mechanical embossing techniques. For example, decorative vinyl flooring products having many different visual effects can be obtained by combining the foregoing techniques. For instance, a vinyl flooring product which embodies the characteristic features of ceramic type floors can be obtained by placing the PVC resin particles in register with the printed portion 12 of substrate 20 that represents the grout lines of a ceramic or clay floor tile product. A foamable vinyl plastisol can be applied over both the regions containing the PVC resin particles and the regions adjacent thereto that do not contain the PVC resin particles. In this instance, a chemical inhibitor is applied to the regions that contain the PVC resin particles, and the entire intermediate laminate is heated to foam or expand the foamable plastisol layer thereby to achieve a decorative floor covering having a differential profile, i.e., an embossed surface, wherein the recessed portions representative of grout lines contain the PVC resin particles and have a low gloss. The raised regions that are representative of the ceramic floor tile surface do not contain the PVC resin particles and have a smoother surface texture and a higher gloss than the recessed grout regions.

The surface texture of regions 18 is characterized by a surface profile of at least 50 micro-inches, root mean square (rms) and, preferably, between about 80 and about 1000 micro-inches (rms). The gloss of textured regions 18 is characterized by a Gardner 60° gloss of less than about 30 gloss units, preferably below about 10 gloss units. In contrast, the smooth and high gloss regions 19 are characterized by a Gardner 60° gloss of greater than 30 gloss units, preferably between about 50 and about 100 gloss units, and most preferably about 80 gloss units.

The Embodiment of FIG. 3

The embodiment of the decorative laminate of the invention shown in FIG. 3 is substantially the same as shown in FIGS. 1 and 2, except that the substrate layer 20 is of composite construction. Specifically, substrate layer 20 comprises a base member 21 of the same material as base member 11 of FIG. 1, and a base member 22 adhered to base member 21. Base member 22 is of foamed resinous polymer such as blown or foamed polyvinyl chloride.

The present invention is illustrated and described further in the following Examples which are merely exemplary and which show typical preferred embodiments thereof. All parts and percentages in the following Examples are by weight, unless otherwise specified.

The gloss and surface profile characteristics of the textured regions of the decorative laminates of the Examples were determined in accordance with the following procedures:

Gloss measurement was obtained using a Gardner, Multi-Angle Glossmeter, Model No. GG9095 of Gardner Lab, Inc., Bethesda, Md., set at a 60° angle.

Patterns were selected to produce textured PVC particulate containing regions and smooth regions larger than 4"×4" squares in order to obtain 60° gloss readings on each region independently.

Profile or surface topography of the raised, PVC particulate containing regions was characterized using a "Profilometer," Micrometrical Manufacturing Company, Ann Arbor, Mich. The instrument was equipped with a 0.0005 in radius diamond stylus and provided a direct readout in RMS (root mean square surface roughness) units that was an average value obtained over a 0.030 inch scan of the sample. The "Profilometer" was calibrated using a Stylus Radial Check standard of 9–13 RMS made by Bendix Corporation, Automation & Measurement Division.

The samples were scanned at a rate of 0.1 inch per second and the average RMS value per inch sample scanned are reported in the Examples.

EXAMPLE 1

This example illustrates the decorative laminate of FIG. 2.

A foamable plastisol composition having the following formulation:

| Formulation A | phr |
| --- | --- |
| Vinyl chloride dispersion resin (Firestone FPC 605) | 72 |
| Vinyl chloride blending resin (Goodyear Pliovic M70) | 28 |
| Primary plasticizer (DOP) | 45 |
| Epoxy stabilizer (Drapex 4.4) | 1.0 |
| Zinc octoate | 1.4 |
| ABFA blowing agent (Azo-bis formamide) Kempore AF | 2.5 | was applied to a thickness of 8 mils onto an 0.032 inch gauge (thick) flooring felt backing and gelled at 320° F. for 1 minute in an air impingement oven.

Thereafter, an image was rotogravure printed onto the above foamable plastisol layer.

Next, a transparent PVC plastisol layer of 5 mils thickness of the following formulation:

| Formulation B | phr |
| --- | --- |
| Vinyl chloride dispersion resin (Tenneco 1755) | 90 |
| Vinyl chloride blending resin (Borden 260 SS) | 10 |
| Primary plasticizer (DOP) | 25 |
| Secondary plasticizer (TXIB-Texanol iso-butyrate) | 17 |
| Epoxy stabilizer (Drapex 4.4) | 3 |
| Tin stabilizer (Mark 275) | 1 | was applied over the printed image and gelled at 320° F.

Next, approximately 4 mils of vinyl plastisol adhesive of the following formulation:

| | phr |
|---|---|
| Vinyl chloride dispersion resin (Tenneco 1732) | 100 |
| Primary plasticizer (DOP) | 35 |
| Secondary plasticizer (TXIB-Texanol iso-butyrate) | 17 |
| Epoxy stabilizer (Drapex 4.4) | 3 |
| Tin stabilizer (Mark 275) | 1 | was applied using a rotary screen/blade coater in register with the rotogravure printed design.

The resultant plastisol printed sheet was then flooded with Geon 92 PVC resin. The Geon 92 vinyl resin adhered to the printed plastisol. The excess resin was removed by dumping and the composite subsequently gelled as described above.

The resultant gelled composite with raised regions containing Geon 92 PVC resin was then overall clear coated using a blotch rotary screen/blade coater. A thin, uniform plastisol coating of Formulation B above was applied on the surface of the Geon PVC particles. Under these conditions, the entire surface of the composite is clear coated, but due to raised Geon 92 containing regions, the thickness of the plastisol clear coat is different between the Geon 92 containing regions and the regions not containing the Geon 92 vinyl particles. The resultant composite was fused and expanded at 400° F. to provide a final product having raised surface textured lower gloss region containing Geon 92 particles and higher gloss, smooth region. An approximately 5 mil embossing was obtained between regions.

The Gardner 60° Gloss of the texture region was measured and found to be between about 2 to 3 gloss units. In contrast, the Gardner 60° Gloss of the smooth regions was measured and found to be about 80 gloss units.

The surface profile of the textured regions was measured and found to be in a range between about 50 and about 190 microinches (rms)—an average of 120 micro-inches (rms).

EXAMPLE 2

Instead of traditional flooring felt backing of Example 1, a vinyl/glass sheet composite backing can be utilized. For example, Schoeller 55/3 glass sheet is completely saturated with the following foamable plastisol composition and the resultant composite gelled at 300° F.

| Plastisol Saturant Formulation | phr |
|---|---|
| Vinyl chloride dispersion resin (Firestone FPC605) | 67 |
| Vinyl chloride blending resin (Goodyear Pliovic M70) | 33 |
| Primary plasticizer (DOP) | 36 |
| Secondary plasticizer (TX1B) | 21 |
| Epoxy stabilizer (Drapex 4.4) | 5 |
| Thermal stabilizer (Barium and Zinc Neodecanoate) | 1.7 |
| ABFA blowing agent (Kempore AF) | 0.9 |

An 8 mil coating of foamable plastisol was applied onto this glass/vinyl composite, gelled and printed as in Example #1. The printed substrate was then processed as described in Example #1 to produce an embossed product with differential gloss and surface texture. If desired the resultant product can be back coated with a smoothing plastisol coat and heated to fully encapsulate the glass sheet in the final structure.

The surface profile of the textured regions of the product of Example 2 was measured and found to be in a range between about 50 and about 175 micro-inches (rms)—an average of 110 micro-inches (rms).

What is claimed is:

1. A method for making a decorative laminate having differential surface texture and differential surface gloss suitable as a floor covering, said method comprising:

applying to a substrate material a vinyl plastisol printing ink composition in register with a printed image on said substrate;

applying an excess of PVC resin particles of type GP PVC resin having a particle size diameter between about 4 mils and about 20 mils, a cell classification number of 4 and a plasticizer absorption greater than about 40 grams per 100 grams of said PVC resin over said printing ink composition and the surface of said substrate and removing the excess of said PVC resin particles that do not adhere to said printing ink composition;

heating said substrate to gel said vinyl plastisol printing ink thereon and thereby firmly adhere said PVC resin particles to said vinyl plastisol printing ink;

forming a top resinous layer on said PVC resin particles and the surface portion of said substrate intermediate said PVC resin particles by applying a transparent synthetic organic polymer over said PVC resin particles and the exposed surface of said substrate; and heating the resulting top resinous layer thereby to provide a fused decorative laminate;

whereby the regions of said decorative laminate overlying said PVC resin particles exhibit a rougher surface texture and a lower gloss than the regions of said decorative laminate intermediate said PVC resin particles.

2. The method of claim 1 wherein the regions of said laminate intermediate said PVC resin particles have a Gardner 60° gloss greater than about 30.

3. The method of claim 2 wherein the textured regions of said laminate have a surface profile of at least 50 micro-inches (rms).

4. The method of claim 3 wherein said PVC resin particles are pigmented.

5. The method of claim 4 wherein said transparent synthetic organic polymer of said top resinous layer is polyvinyl chloride.

6. The method of claim 1 wherein said substrate comprises a flexible base member and a layer of a foamed polyvinyl chloride resin bonded to at least one surface of said flexible base member.

7. The method of claim 6 wherein said flexible base member is a resin-impregnated web of felted fibers.

8. The method of claim 7 wherein the regions of said laminate intermediate said PVC resin particles have a Gardner 60° gloss greater than about 30.

9. The method of claim 8 wherein the textured regions of said laminate a surface profile of at least 50 micro-inches (rms).

10. A method for making a decorative laminate having differential surface texture and differential surface gloss suitable as a floor covering, said method comprising:

forming a printed, gelled, base resinous layer onto a substrate material by applying a transparent synthetic organic polymer onto a substrate having a printed image thereon, and heating said resinous layer thereby to provide said printed, gelled, base resinous layer;

applying to said gelled, base resinous material a vinyl plastisol printing ink composition in register with said printed image;

applying an excess of pigmented PVC resin particles of type GP PUC resin over said printing ink composition and the surface of said gelled, base resinous layer and removing the excess of said pigmented PVC resin particles that do not adhere to said printing ink composition;

heating said gelled, base resinous layer to gel said vinyl plastisol printing ink thereon and thereby firmly adhere said PVC resin particles to said vinyl plastisol printing ink;

forming a top resinous layer on said PVC resin particles and the surface portion of said base resinous layer intermediate said PVC resin particles by applying a transparent synthetic organic polymer over said PVC resin particles and the exposed surface of said base resinous layer; and heating the resulting top resinous layer thereby to provide a fused decorative laminate;

whereby the regions of said decorative laminate overlying said PVC resin particles exhibit a rougher surface texture and a lower gloss than the regions of said decorative laminate intermediate said PVC resin particles 11. The method of claim 10 wherein the regions of said laminate intermediate said PVC resin particles have a Gardner 60° gloss greater than about 30.

12. The method of claim 11 wherein the textured regions of said laminate have a surface profile of at least 50 micro-inches (rms).

13. The method of claim 12 wherein said PVC resin particles are pigmented.

14. The method of claim 13 wherein the transparent synthetic organic polymer of said base resinous layer and said top resinous layer is polyvinyl chloride.

15. The method of claim 14 wherein said substrate comprises a flexible base member and a layer of a foamed polyvinyl chloride resin bonded to at least one surface of said flexible base member.

16. The method of claim 15 wherein said flexible base member is a resin-impregnated web of felted fibers.

17. The method of claim 16 wherein the regions of said laminate intermediate said PVC resin particles have a Gardner 60° gloss greater than about 30.

18. The method of claim 17 wherein the textured regions of said laminate have a surface profile of at least 50 micro-inches (rms).

* * * * *

UNITED STATES PATENT AND TRADEMARK OFFICE
CERTIFICATE OF CORRECTION

PATENT NO. : 4,530,856
DATED : July 23, 1985
INVENTOR(S) : William J. Kauffman et al.

It is certified that error appears in the above-identified patent and that said Letters Patent are hereby corrected as shown below:

In the Specification, in column 1, line 12, the word "laminated" should read --laminate--.

In the Claims, claim 10 at column 13, line 6, the word "PUC" should read --PVC--, and after "resin" insert the following wording --having a particle size diameter between about 4 mils and about 20 mils, a cell classification number of 4 and a plasticizer absorption greater than about 40 grams per 100 grams of said PVC resin--.

Signed and Sealed this

Twenty-fourth Day of June 1986

[SEAL]

Attest:

DONALD J. QUIGG

Attesting Officer

Commissioner of Patents and Trademarks